United States Patent
Haimer (10) Patent No.: US 9,586,267 B2
(45) Date of Patent: Mar. 7, 2017

(54) APPARATUS AND METHOD FOR CLAMPING A COMPONENT ON A ROTATING MACHINE PART

(75) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 306 days.

(21) Appl. No.: 14/241,205

(22) PCT Filed: Aug. 26, 2011

(86) PCT No.: PCT/EP2011/064692
§ 371 (c)(1),
(2), (4) Date: May 2, 2014

(87) PCT Pub. No.: WO2013/029645
PCT Pub. Date: Mar. 7, 2013

(65) Prior Publication Data
US 2014/0353930 A1    Dec. 4, 2014

(51) Int. Cl.
*B23B 31/16* (2006.01)
*B23B 31/173* (2006.01)
*B23B 31/20* (2006.01)

(52) U.S. Cl.
CPC ........ *B23B 31/16* (2013.01); *B23B 31/16158* (2013.01); *B23B 31/208* (2013.01);
(Continued)

(58) Field of Classification Search
CPC . B23B 31/16; B23B 31/16158; B23B 31/208; B23B 2270/12; B23B 2231/50; Y10T 279/1041; Y10T 29/49998
See application file for complete search history.

(56) References Cited

U.S. PATENT DOCUMENTS 1,873,515 A    8/1932  Warren
3,885,825 A *  5/1975  Amberg ................ B29C 63/426
                                                    198/377.07
(Continued)

FOREIGN PATENT DOCUMENTS

DE    20007116 U1   7/2000
SU     1359079 A1  12/1987
WO       0045983     8/2000

OTHER PUBLICATIONS

International Search Report date May 2, 2012 for International Application PCT/EP2011/064692 filed Aug. 26, 2011.
(Continued)

*Primary Examiner* — Richard Chang
(74) *Attorney, Agent, or Firm* — Paul D. Bianco; Gary S. Winer; Fleit Gibbons Gutman Bongini & Bianco PL (57) ABSTRACT

An apparatus for clamping a component on a rotating machine part, in particular a balancing machine, having a basic body, having a clamping mandrel, which is arranged in an axially displaceable manner within the basic body, and having a plurality of clamping devices, which can be moved between a release position and a clamping position by axial displacement of the clamping mandrel. In order to make it possible for components to be clamped centrally with repeated accuracy, the clamping devices are designed as clamping segments which can be displaced radially in relation to the center axis of the basic body above the latter.

18 Claims, 10 Drawing Sheets

(52) U.S. Cl.
CPC ....... *B23B 2231/50* (2013.01); *B23B 2270/12* (2013.01); *Y10T 29/49998* (2015.01); *Y10T 279/1041* (2015.01)

(56) References Cited

U.S. PATENT DOCUMENTS

| | | |
|---|---|---|
| 4,496,165 A | 1/1985 | Schrekeis et al. |
| 2009/0075570 A1 | 3/2009 | Levsen |

OTHER PUBLICATIONS

Written Opinion for International Application PCT/EP2011/064692 filed Aug. 26, 2011.
English Translation of International Preliminary Report on Patentability published Mar. 4, 2014 for PCT/EP2011/064692.
English Translation of Written Opinion published Feb. 26, 2014 for PCT/EP2011/064692.

* cited by examiner

APPARATUS AND METHOD FOR CLAMPING A COMPONENT ON A ROTATING MACHINE PART

FIELD OF THE INVENTION

The invention concerns an apparatus for the clamping of a component on a rotating machine part, in particular, a balancing machine. The invention also concerns a method for the creation of an inside or outside clamping to clamp a component on a rotating machine part.

BACKGROUND OF THE INVENTION

An apparatus is known for the clamping of a component on a rotating machine part of a balancing machine from WO 00/45983 A1. The clamping apparatus disclosed there is designed for the centric clamping of tool holders, provided with a hollow shank taper, on a balancing machine. The clamping device contains for this purpose a basic body with a conical holder opening into which the hollow shaft taper of the tool holder to be clamped is inserted. A clamping collet with radially movable collet elements is located within the basic body; it can move by means of an axially movable inner clamping mandrel between a radial inner release position and a radial outer clamping position. The collet elements serving as the clamping device are designed in such a way that, in the clamping position, they mesh into an inner annular groove in the hollow shaft taper and pull it, in the axial direction, into the conical holder opening of the basic body. The tool holder is centered by the axial pulling of the hollow shaft taper into the corresponding conical holder opening of the basic body.

SUMMARY OF THE INVENTION

The goal of the invention is to create an apparatus and a method that also make it possible for components to be clamped centrally with repeated accuracy, without a hollow shaft taper or other centering devices.

This goal can be attained by an embodiment of the apparatus as disclosed herein and with a method as disclosed herein. Advantageous developments and appropriate refinements of the clamping apparatus in accordance with the invention are also disclosed.

With the clamping apparatus in accordance with the invention, the clamping device, which can move between a release position and a clamping position by axial displacement of the clamping mandrel, comprises clamping segments, which, can be displaced radially above the basic body, relative to its center axis. The clamping segments move in a plane that is vertical to the center axis of the housing, in a uniformly radial manner, toward the outside or inside, and, without appreciable axial forces, exert a force effect in the radial direction. By the radial-symmetrical displacement of the clamping segments, there is, in addition to the clamping, a centering in the same operation. The pressure force that is transferred from the clamping mandrel to the clamping segments, as was already mentioned, acts in an essentially radially symmetrical manner. Therefore, if a component or workpiece is not set centrically on the workpiece support, that is, if the center axis of the component is not aligned with the rotation axis of the clamping device, a clamping surface will initially be at a smaller distance from the center axis of the component to be clamped than other clamping surfaces of the clamping segments. In this way, this one clamping segment arrives first at the support on the component, whereas the other segments are not yet next to the component. In the further course of the clamping process, the clamping segment or the clamping device is bent toward the clamping direction. In this way, a material-caused restoring force is produced in the pertinent clamping segment or clamping device. As a result, the component on the workpiece support is moved or displaced in such a way that the pressure force of the clamping surfaces is again compensated in a radially symmetrical manner and the initially increased pressure force on the one clamping surface is again compensated with the pressure force on the other clamping surfaces. By this displacement, accordingly, a centering of the component takes place. By the radial-symmetrical force effect, components without a hollow taper or other special centering devices can also be clamped, without axial pulling-in forces, in an accurate and centric manner, both on the inside as well as on the outside. The centering is brought about both in case of an inside clamping and also in the case of an outside clamping of the component.

In a particularly appropriate embodiment, the radially displaceable clamping segments are connected to one another by flexible connecting cross-links. By means of the connecting cross-links, a kind of elastic disk is formed, which makes possible a uniform radial displacement of the clamping segments and resilience. The connecting cross-links can be formed by slots, recesses, or the like, in an advantageous manner.

In another expedient development, the clamping segments are constructed as parts of an annular clamping element arranged above the basic body. In this way, a uniform adjustment with a simultaneously higher restoring force is attained. The clamping element can be made with the individual clamping segments made from one part and, if necessary, can be simply installed and replaced.

The clamping segments are preferably affixed in a detachable manner on a clamping head, which can be extended radially by the clamping mandrel. In this way, the clamping segments can be replaced simply and the clamping apparatus can be adapted to different clamping tasks without any problem.

The clamping head, which appropriately contains a lower holding flange for the affixing on the basic body and an upper holding flange for the affixing of the annular clamping element or of the clamping segments, has a central passage opening with an at least partially conical inner wall for the holding of a conical clamping part of the clamping mandrel. In order to attain an extension effect, the clamping head can have several slot-shaped recesses and openings in the upper holding flange, running radially outward from the passage opening.

In another appropriate development, a support for the placing of the components to be clamped can be arranged below the clamping segments. The components to be clamped can be placed on this support. The support is appropriately arranged on the basic body, but can also be part of the machine on which the component is to be clamped.

A pressure element, consisting of one or more parts, in the form of elastic inserts or the like, can be arranged around the clamping head. In this way, the symmetrical spreading and the centering effect can be supported.

The clamping segments can have only one or also several clamping surfaces for the clamping of components with different diameters. Appropriately, the several clamping surfaces can be arranged, for example, in steps, in various planes.

The invention also concerns a method for the clamping of a workpiece on a rotating component.

To produce an inside clamping, the method comprises the following steps:
- preparation of an apparatus with at least one clamping head, a clamping mandrel, and clamping segments;
- placing of the component to be clamped via the clamping segments;
- exerting of a first radial force, proceeding from the clamping mandrel onto the clamping head by actuation of the clamping mandrel;
- radial extension of at least one part of the clamping head by the first radial force;
- exerting of a second radial force, analogous to the first radial force, proceeding from the clamping head onto the clamping segments by the radial extension of the at least one part of the clamping head;
- radial displacement of at least one clamping segment by the second radial force and exerting of a clamping effect onto the component by the radial displacement of the at least one clamping segment.

To produce an outside clamping, the method comprises the following steps:
- preparation of an apparatus with at least one clamping head, a clamping mandrel, and clamping segments with holding cross-links
- exerting of a first radial force, proceeding from the clamping mandrel onto the clamping head by actuation of the clamping mandrel;
- radial extension of at least one part of the clamping head by the first radial force;
- exerting of a second radial force, analogous to the first radial force, proceeding from the clamping head onto the clamping segments by the radial extension of the at least one part of the clamping head;
- radial displacement of at least one clamping segment by the second radial force and radial expansion of the gap thereby caused, between the holding cross-links;
- insertion of the component to be clamped into the gap between the holding cross-links;
- release of the first and the second radial forces by the return of the clamping mandrel to the state before its actuation;
- exerting of a clamping effect onto the component by a material-caused restoring force of the clamping segments and the clamping head via the holding cross-links.

BRIEF DESCRIPTION OF THE DRAWINGS

Other special features and advantages of the invention can be deduced from the following description of preferred embodiment examples with the aid of the drawing. The figures show the following.

DETAILED DESCRIPTION OF THE INVENTION

Figure 1:
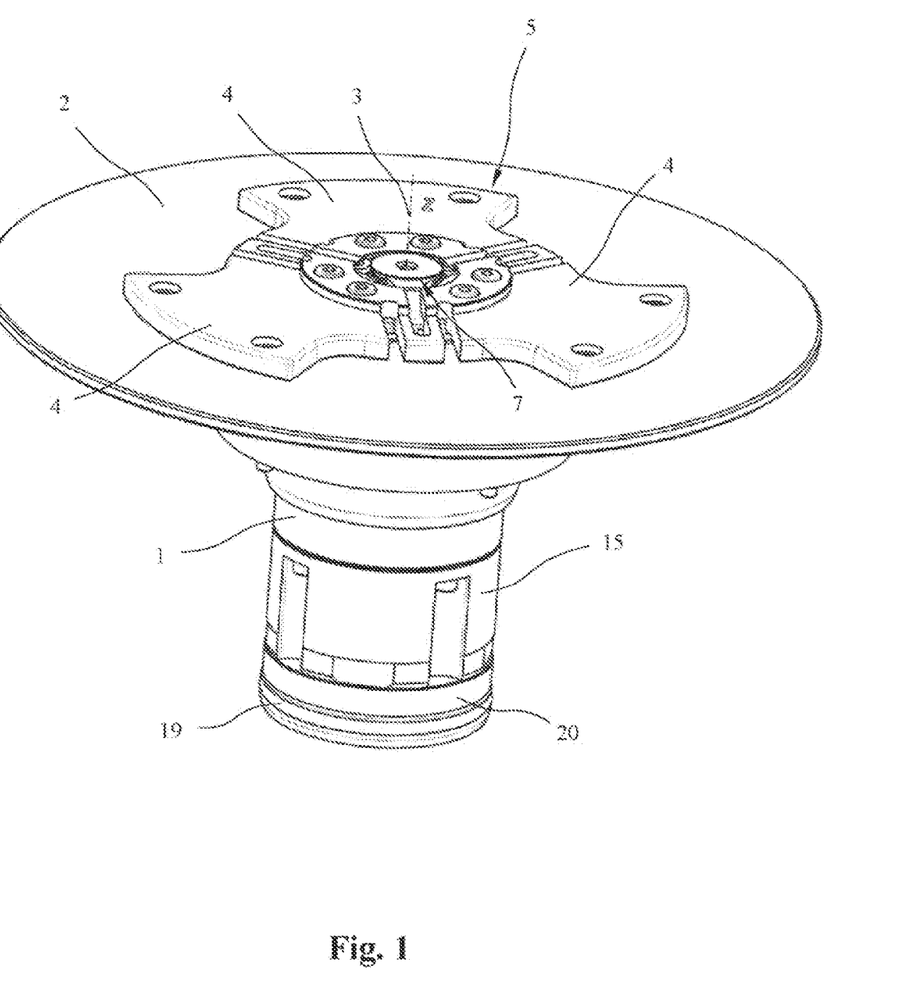
FIG. 1: an embodiment example of an apparatus for the inside clamping in a perspective.
Figure 2:
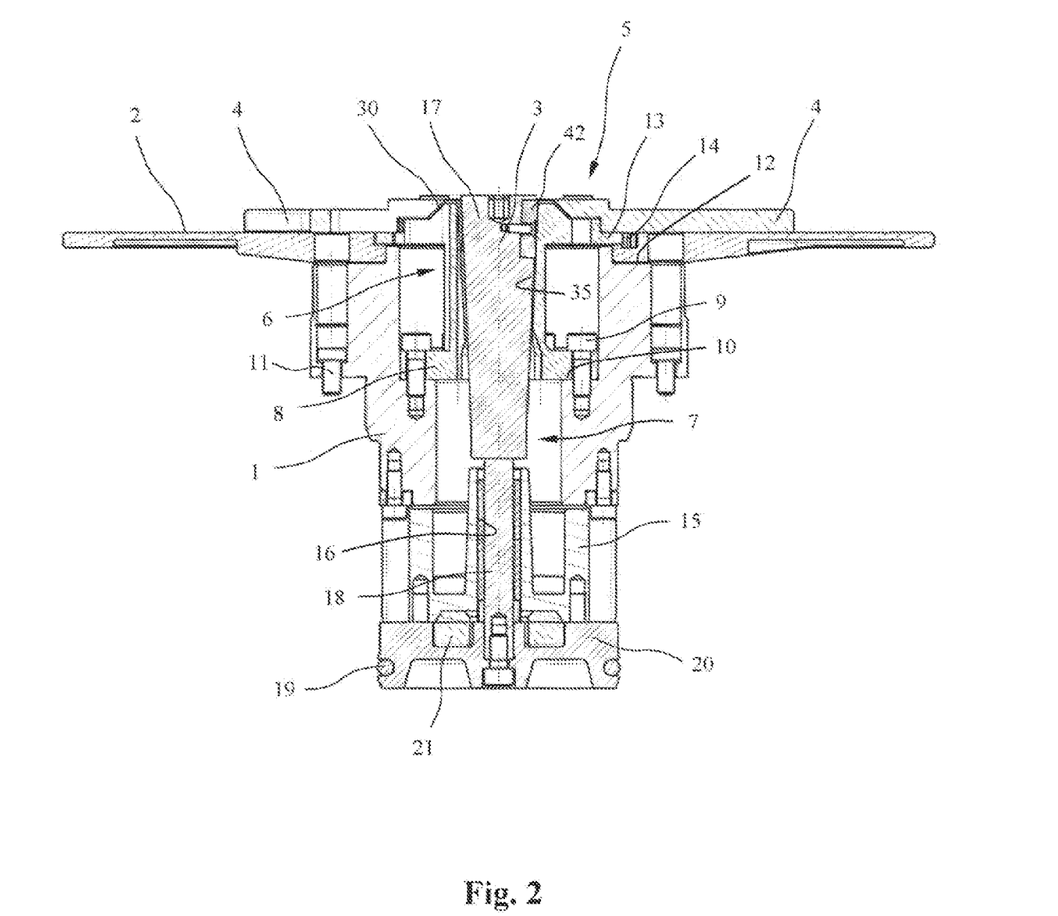
FIG. 2: a sectional view of the apparatus of FIG. 1.
Figure 3:
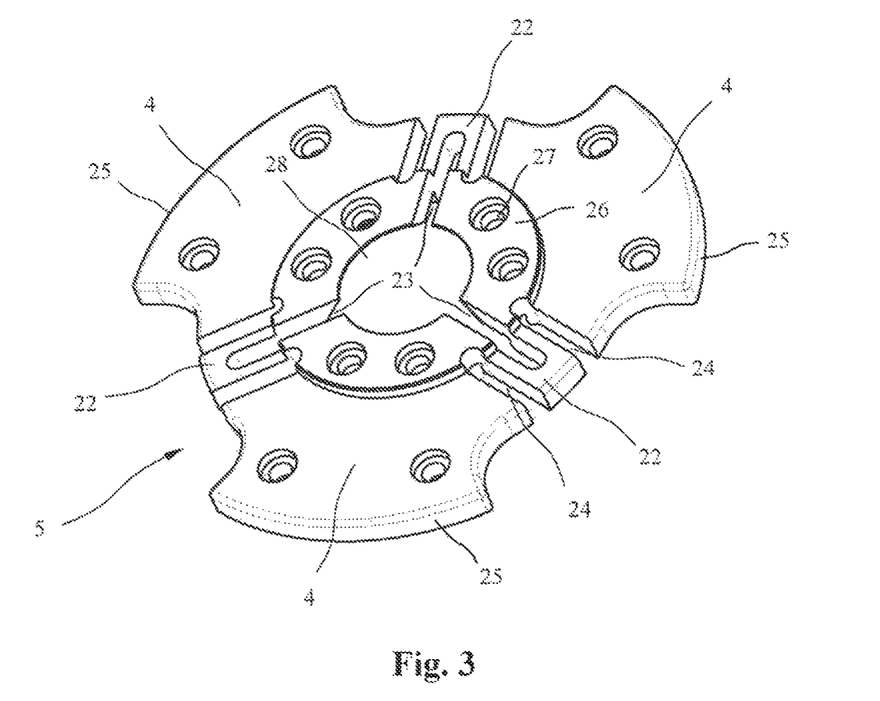
FIG. 3: a first embodiment example of a disk-shaped clamping element in a perspective from above.
Figure 4:
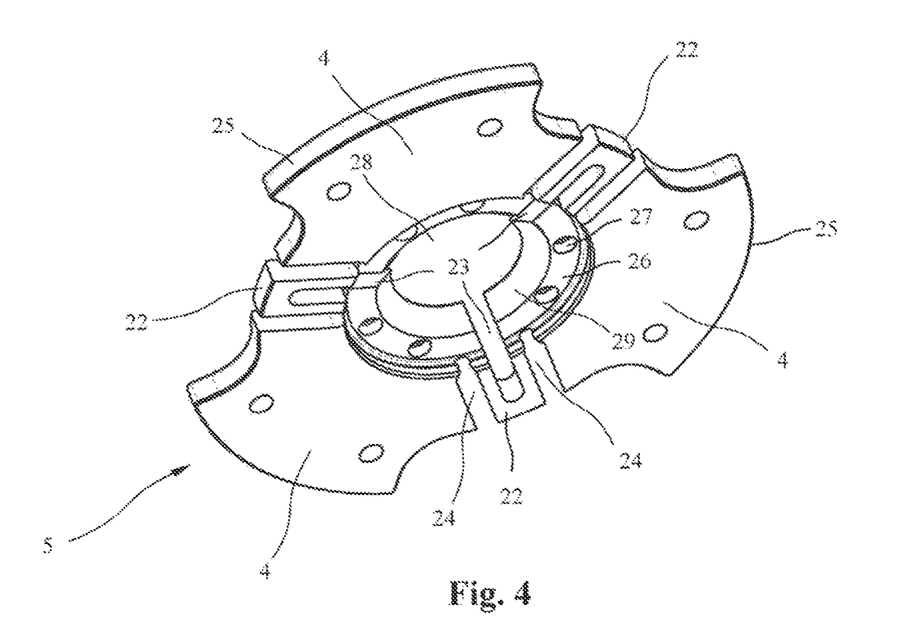
FIG. 4: the disk-shaped clamping element of FIG. 3 in a perspective from below.

The clamping apparatus shown in FIGS. 1 and 2 contains a hollow-cylindrical basic body 1 with a clamping mechanism, which comprises several flat clamping segments 4, which move radially, above a disk-shaped support 2, relative to a center axis 3 of the basic body 1. In the embodiment shown, the radially movable clamping segments 4 are parts of a disk-shaped clamping element 5, which is shown in FIGS. 3 and 4 and which is affixed, in a detachable manner, on a sleeve-shaped clamping head 6, shown in FIGS. 7 and 8. The clamping mechanism also contains a clamping mandrel 7, which is axially displaceable within the clamping head 6; with its axial movement, the clamping segments 4 can be displaced transverse to the center axis 3 of the basic body 1 between a radial outside clamping position and a radial inside release position.

As can be deduced from FIG. 2, the sleeve-shaped clamping head 6 is fixed, via a lower holding flange 8, with the aid of screws 9 on an inner annular heel 10 in the interior of the, for example, hollow-cylindrical basic body 1, which can be fastened on a rotating part of a balancing machine via screws 11 or other fastening element. The disk-shaped support 2 is arranged on an outer annular heel 12 on the upper end of the basic body 1 and is held by an upper holding flange 13 of the sleeve-shaped clamping head 6. Elastic inserts 14 are arranged between the upper holding flange 13 of the clamping head 6 and the inside of the disk-shaped support 2. In this way, it is possible to support the symmetrical spreading and the centering effect of the clamping apparatus.

A holder 15 is fastened on the underside of the basic body 1 with a central passage borehole 16. The clamping mandrel 7 contains an upper conical clamping part 17 and a cylindrical lower pin 18 projecting through the passage borehole 16, on whose end, protruding downward opposite the holder 15, is fastened a piston 20, provided with a radial sealing ring 19. The piston 20 is pretensioned axially opposite the holder 15, fastened on the underside of the basic body 1 by—not shown—compression spring. The clamping mandrel 7 with the clamping part 17 expanding conically upward is pressed into a lower clamping position via the compression springs. In the lower clamping position, the clamping segments 4 are pressed radially outward via the clamping head 6. To displace the clamping segments 4 into the radial inner release position, it is possible to move the clamping mandrel 7 by means of the piston 20, which can be impinged on by, for example, compressed air, against the force of the compression springs within the basic body 1, axially upward into a release position, shown in FIG. 2, wherein the clamping segments 4, pretensioned radially inward, move from their radial outer clamping position into the radial inner release position. An annular damper element 21 is arranged between the holder 15 and the piston 20.

FIGS. 3 and 4 show a first embodiment example of a disk-shaped clamping element 5, in which the clamping segments 4, designed as annular segments, are connected to one another via U-shaped, flexible connecting cross-links 22. The disk-shaped clamping element 5, designed as an annular disk, is made from one part, with radial inner slots 23 and radial outer slots 24. The U-shaped connecting cross-links 22 between the clamping segments 4 are limited by an inner slot 23, open inward, and two outer slots 24, open outward. A kind of elastic disk, which makes possible a radial displacement of the clamping segments 4 and resilience, is formed by the thus designed connecting cross-links 22. The clamping segments 4 have outer clamping surfaces 25 and inner annular segment-shaped supports 26 with boreholes 27 for the fastening on the clamping head 7. The passage opening 28 of the disk-shaped clamping element 5 is adapted to the upper end of the clamping head 6. Conical support surfaces 29, seen in FIG. 4, for the support on counter surfaces 30, seen in FIG. 7, on the upper end of the clamping head 6, are provided on the inside of the ring segment-shaped supports 26.

Figure 5:
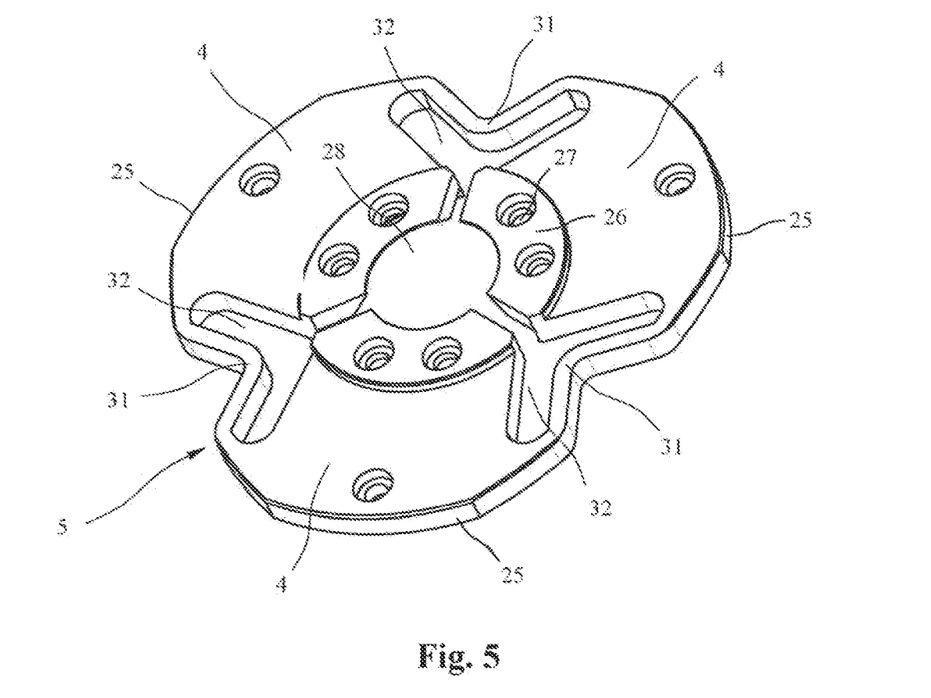
FIG. 5: a second embodiment example of a disk-shaped clamping element in a perspective from above.
Figure 6:
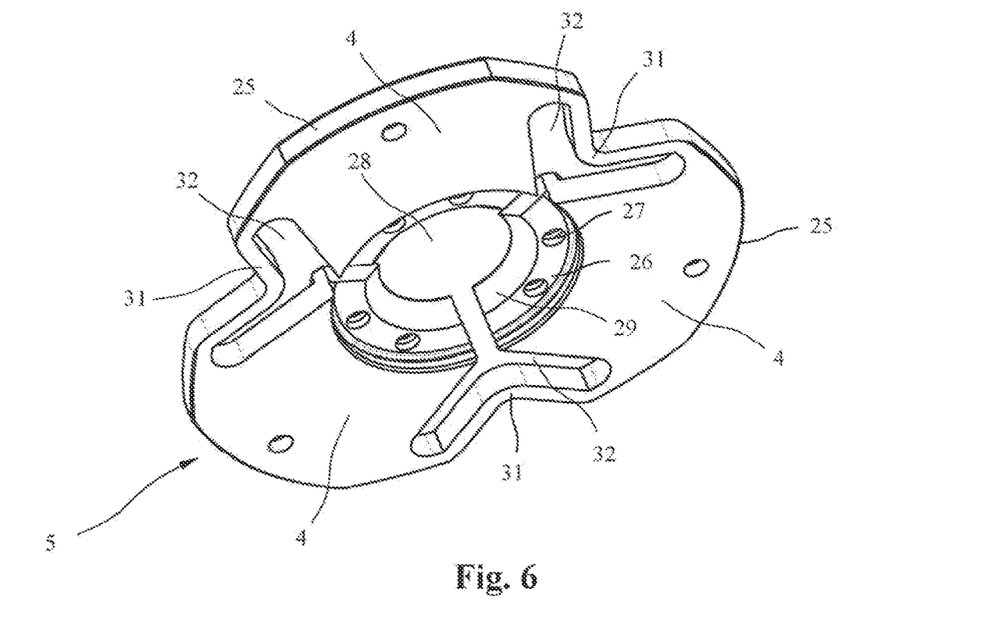
FIG. 6: the disk-shaped clamping element of FIG. 5 in a perspective from below.

FIGS. 5 and 6 show another embodiment example of a disk-shaped clamping element 5. In this embodiment, the clamping segments 4 are connected to one another via V-shaped, flexible connecting cross-links 31. Here too, the disk-shaped clamping element 5, designed as an annular disk, is produced from one part, wherein the V-shaped connecting cross-links 31 are formed by a Y-shaped recess 32. The clamping segments 4 also have outer clamping surfaces 25 and inner ring segment-shaped supports 26 with boreholes 27 for the fastening on the clamping head 7. Furthermore, conical support surfaces 29, seen in FIG. 6, for the support on counter-surfaces 30, seen in FIG. 7, on the upper end of the clamping head 6 are present also on the inside of the annular segment-shaped supports 26.

Figure 7:
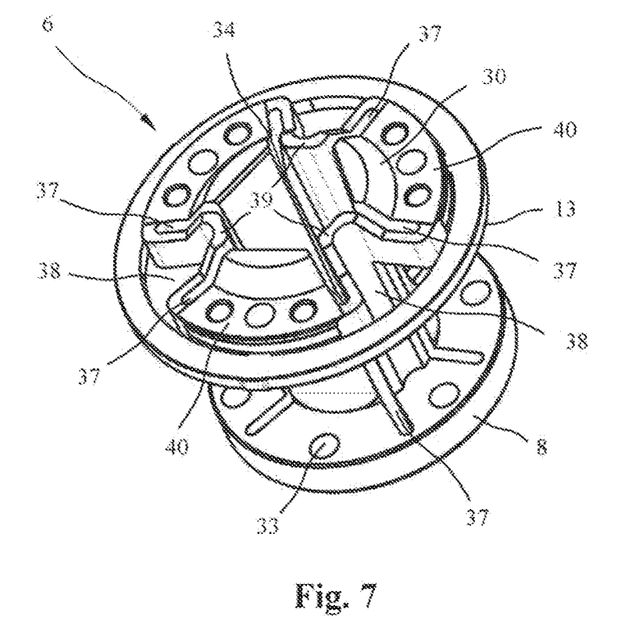
FIG. 7: a clamping head in a perspective from above.
Figure 8:
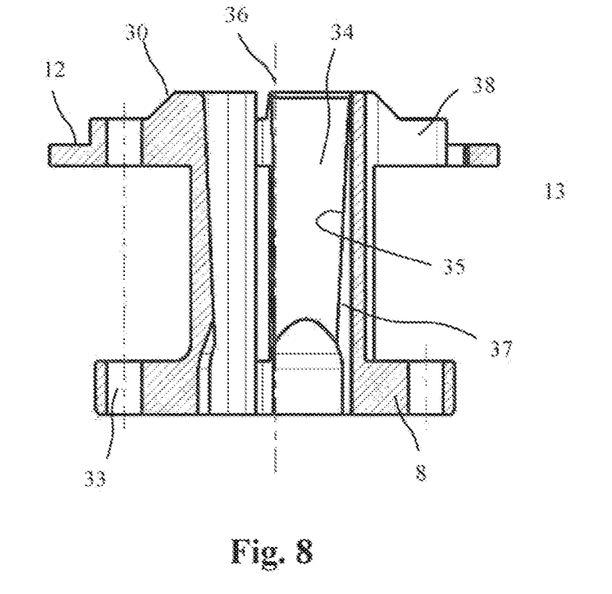
FIG. 8: the clamping head of FIG. 7 in a sectional view.

FIGS. 7 and 8 show the clamping head 6 in a perspective and a longitudinal section. As already explained, the clamping head has a lower holding flange 8 with boreholes 33 for the fastening of the basic body 1 on the inner annular heel 10. The clamping head 6 also contains an upper holding flange 13 with an annular heel 12, on which the disk-shaped base 2 can lie.

Figure 12:
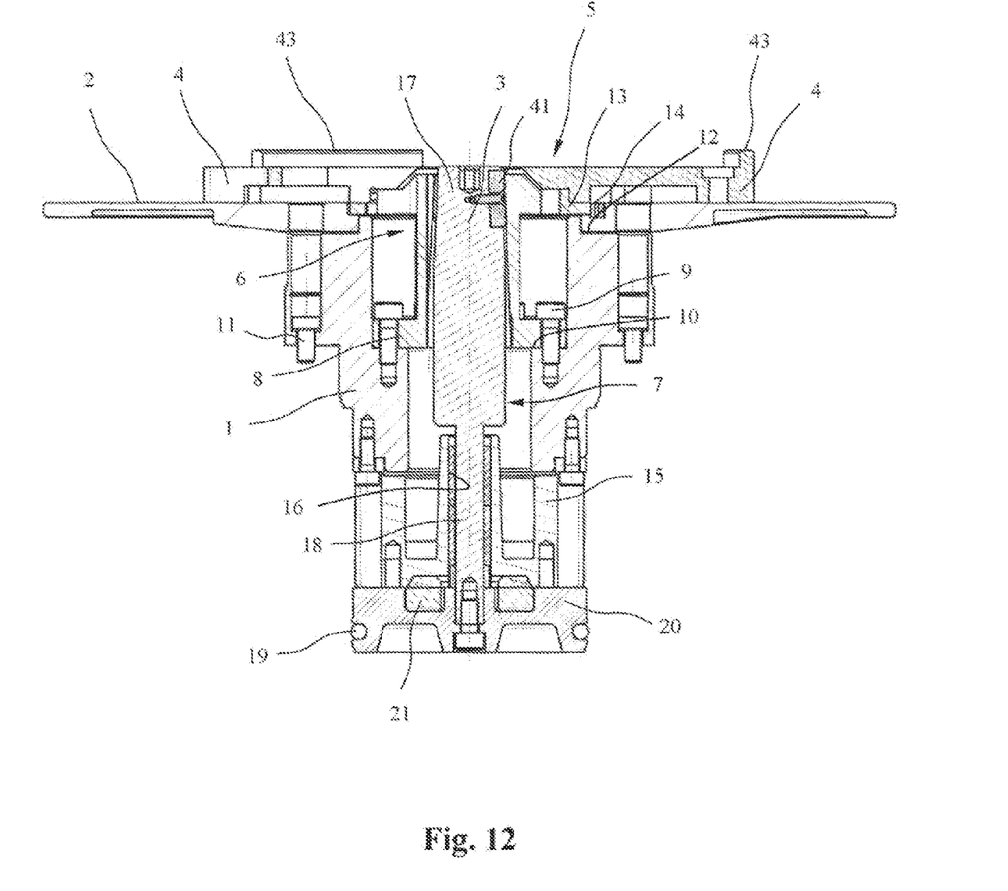
FIG. 12: a sectional view of the apparatus of FIG. 11.

The clamping head 6 has a central passage opening 34 to hold the clamping mandrel 7; the opening, proceeding from the lower holding flange 8, is extended through the entire clamping head 6 to the upper holding flange 13. This passage opening 34 has an at least partially conical inner wall 35. In the embodiment of the clamping head 6 intended for the inner clamping shown in FIGS. 7 and 8, the passage opening 34 has a conically expanding cross section from the lower holding flange 8 to the upper holding flange 13. The corresponding clamping mandrel 7, shown in FIG. 2, contains a conical clamping part 17, which expands upward, so that the clamping segments 4 are displaced radially outward when the clamping mandrel 7 is pulled in. The outer clamping surfaces 25 of the clamping segments 4 can then arrive at the centric inside clamping, for example, for the placement on the inner wall of a hollow-cylindrical component. For the outer clamping, the passage opening 34 can also have a conically tapering cross section from the lower holding flange 8 to the upper holding flange 13, as it is shown in FIG. 12 and as is explained in more detail below.

In both possible embodiments, the conical course of the passage opening 34 can extend only over a part of the inner wall 35. The cross section of this passage opening 34 can be round or oval, as, for example, with a truncated cone, but can also have an essentially angular basic form, as, for example, a truncated pyramid. The projection of the cross section of the passage opening 34 onto a surface perpendicular to the center axis 36 of the clamping head can be a polygon with an arbitrary shape, in accordance with FIG. 7, for example, a regular or irregular hexagon, a regular or irregular octagon or an arbitrary star shape. The passage opening 34 can also have different points with different cross sections. Thus, for example, an embodiment can be conceived in which the cross section of the passage opening 34 forms an arbitrary polygon on the upper holding flange 13, whereas the cross section on the lower holding flange 8 is round or oval, wherein, in this regard, there is, of course, an appropriate transition area within the inside wall 35 of the passage opening 34 of the clamping head 6. Also, several cross section changes, that is, changes of the diameter in the course of the passage opening 34, are possible in the direction of the center axis 36, with the pertinent transition areas. The effective principle of the clamping by means of the inside or outside clamping remains unchanged thereby.

The clamping head 6 has several recesses 37, which are slot-shaped here, both for the inside clamping as well as the outside clamping; they extend along the entire length of the clamping head 6 from the passage opening 34, radially outward. These recesses 37 can also be expanded in places in such a way that they form radial passages. In a possible embodiment in which the cross section of the passage opening 34 is not round or oval, but rather forms a polygon, the recesses 37 are preferably found on the corners of this polygon. The recesses 37 can also be designed so they are turned or staggered relative to one another, that is, they can also form an arbitrary spiral shape in the passage opening 34 of the clamping head 6 or run parallel to the center axis 36.

In the upper holder flange 13, triangular openings 38 are also provided here in the embodiment shown in FIGS. 7 and 8. The openings 38 are made for the formation of V-shaped connecting cross-links 39 between annular segment-shaped parts 40 of the upper holding flange 13. With this design of the clamping head 6, it can, at least in part, expand or contract radially relative to the center axis 36, as soon as there is a force that is radially outward or inward on the clamping head 6.

An embodiment of the clamping head 6 whose expansion effect comprises an expansion outward (for inside clamping) and also a contraction inward (for outside clamping), depending on the applied force (radially outward or inward) is also possible. For this embodiment, the inside wall 35 of the passage opening 34 of the clamping head 6 must be correspondingly adapted, for example, by using more than only one conical area or by using different cross sections of the passage opening 34. Preferably, in this embodiment, the inside wall 35 of the passage opening 34 is made by an at least double conical course. Proceeding from the lower holding flange 8 to the upper holding flange 13, the passage opening 34 is thereby initially expanded conically in a first area and subsequently runs, once again, conically tapered or constricted in a second area.

The clamping head 6 is preferably formed in one piece or from one piece. For example, it is milled from a blank, cast from a mold, or printed in a 3-D printing method. The clamping head 6 is preferably produced from tool steel, but can, according to need, be made from any other material suitable for the pertinent purpose. The clamping head 6 can consist of several parts that are put together. For example, the clamping head 6 can be made of at least two parts that are firmly connected to each other, if it is the embodiment that is designed both for inside clamping and also for outside clamping.

Figure 9:
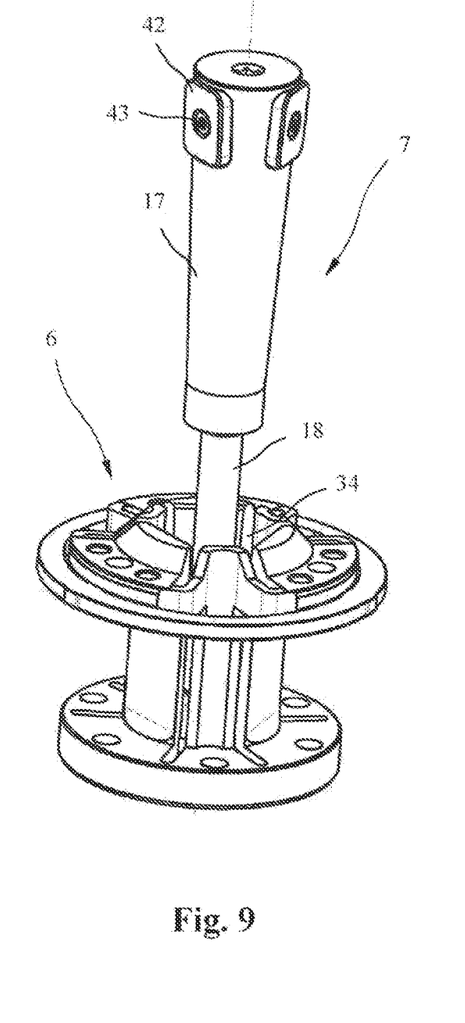
FIG. 9: the clamping head of FIG. 7 with a clamping mandrel in an exploded view.
Figure 10:
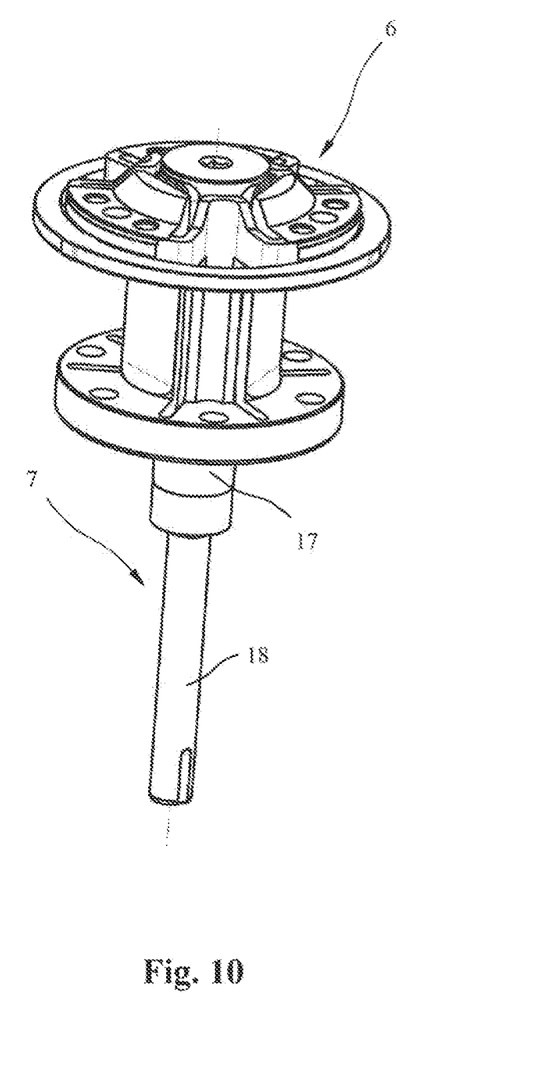
FIG. 10: the clamping head of FIG. 7 with the clamping mandrel when installed.

FIG. 9 shows the clamping head 6 of FIGS. 7 and 8 with the corresponding clamping mandrel 7 in an exploded view, whereas FIG. 10 shows the clamping head 6 and the corresponding clamping mandrel 7 when put together. The clamping mandrel 7 contains the upper conical clamping part 17 and the cylindrical lower pin 18, wherein the outer contour of the conical clamping part 17 is adapted to the inner contour of the passage opening 34 of the clamping head 6. The clamping mandrel 7 is arranged so it can be displaced in the passage opening 34 of the clamping head 6 and lies with at least one part, preferably with as large as possible a part of the outside surface of the conical clamping part 17, on the inside wall 35 of the passage opening 34. On the outside of the clamping mandrel 7, it is possible to place one or more contour supports 41, shown in FIG. 10, in the contact area to the inside wall 35 of the passage opening 34. These contact supports 41 are traditional wear and tear parts and therefore are installed on the clamping mandrel 7 with screws 42 or the like so that they can be replaced, so as to protect the clamping mandrel 7 itself from excessive wear and tear due to friction or pressure. The clamping mandrel 7 is preferably made from one piece. It can be milled from a blank, cast from a mold, or printed in a 3-D printing method. However, it can also consist of several parts. The clamping mandrel is preferably made of tool steel, but it can also be produced from any other material suitable for the individual purpose, according to need.

In the embodiment shown in FIGS. 1 and 2 for the inside clamping of a component, the clamping mandrel 7 is pulled into the passage opening 35 of the clamping head 6, which tapers conically downward, with the conical clamping part 17, which expands upward, by means of the compressing springs, which are under tension between the piston 20 and the holder 15. In this way, at least the upper holding flange 13 of the clamping head 6 is pressed apart radially. The radial expansion of the clamping head 6 is transferred to the clamping segments 4 of the disk-shaped clamping element 5, placed on the clamping head 6, which, in turn, move outward and, via the outside pressure surfaces 25, exert a holding force on the component to be clamped. Via the connecting elements 22 between the clamping segments 4 of the clamping element 5, an elastic effect is attained, which brings about a resetting of the clamping segments 4 with a displacement of the clamping mandrel 7 into the upper release position, shown in FIG. 2.

In order to trigger the clamping apparatus, the clamping mandrel 7 must be displaced into the upper release position, via the pneumatically actuatable piston 22, against the force of the compression springs, wherein clamping segments 4 of the clamping element 5 move back into the radial inner release position as a result of the elastic effect. Then, the component to be clamped can be removed or a component for the clamping can be placed on the disk-shaped support 2.

Figure 11:
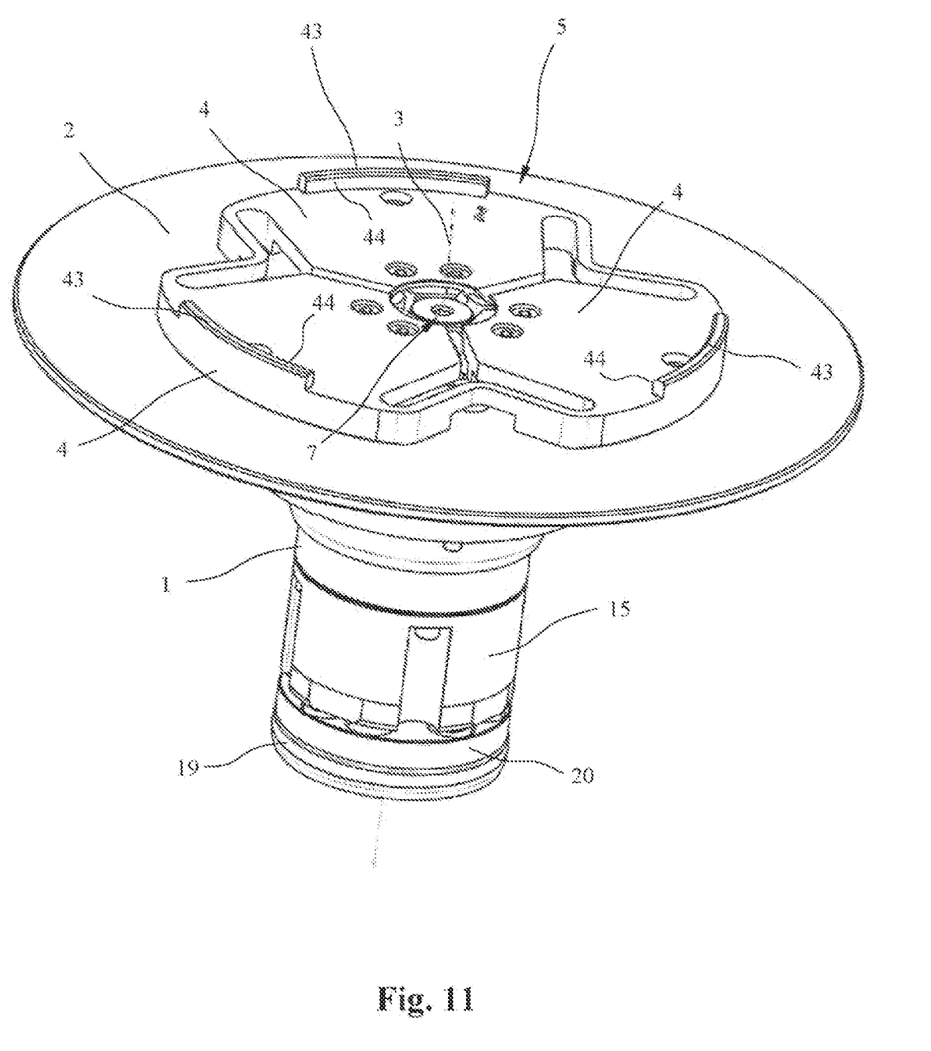
FIG. 11: an embodiment example of an apparatus for the outside clamping in a perspective.

In FIGS. 11 and 12, a clamping apparatus designed for outside clamping is shown. This apparatus differs from the clamping apparatus shown in FIGS. 1 and 2 merely in the development of the disk-shaped clamping element 5, the clamping head 6, and the clamping mandrel 7. In this embodiment, annular segment-shaped holding cross-links 43, protruding upward, or other holding elements with inner clamping surfaces 44 for placement on the outside of a component to be clamped are arranged on the clamping segments 4 of the disk-shaped clamping element 5. The clamping head 6 has a passage opening 34 that tapers conically from the lower annular flange 8 in the direction of the upper annular flange 13. Correspondingly, the clamping mandrel 7 has a conical clamping area 17 that tapers upward.

In order to clamp a component with outside clamping, with the aid of this clamping apparatus, the clamping mandrel 7 is first pressed out, in the direction of the center axis 3 of the basic body 1, upward, opposite the upper holding flange 13 of the clamping head 6, wherein the upper holding flange 13 is at least partially radially expanded due to the at least in partially conical course of the conical clamping area 17 and the inner wall 35 of the passage opening 34. In this way, the clamping segments 4 of the clamping element 5, arranged on the upper holding flange 13, and with it, the holding cross-links 43 are also stretched or widened, outward and radially, relative to the center axis 3. In this state, the component can be introduced into the area within the holding cross-links 43. If the clamping mandrel 7 is once again moved back into its starting position, the clamping head 6, and with it, the clamping segments 4 of the disk-shaped clamping element 5, again return to the starting position due to the resetting force caused by the material. In this way, the holding cross-links 43 move radially toward the center axis 3, wherein the component is clamped from the outside by the resetting force.

In contrast to the embodiment of FIGS. 1 and 2, in which the holding force for the inside clamping by the clamping mandrel 7, via the clamping head 6, is exerted on the clamping segments 4 of the clamping element 5, the holding force for the outside clamping by the material-caused resetting force of the clamping head 6 and the clamping element 5 is exerted via the holding cross-links 43 in the embodiment of FIGS. 11 and 12. Therefore, with the outside clamping, the clamping element 5 must first be extended outward and radially, relative to the center axis, so as to be able to introduce a workpiece, whereas in the case of inside clamping, the workpiece must be placed immediately on the clamping element 5. Depending on the embodiment, for inside clamping or outside clamping, the at least one clamping surface 24 or 44 pressure surface [sic] of the clamping element must be pressed against the component for a firm holding.

Figure 13:
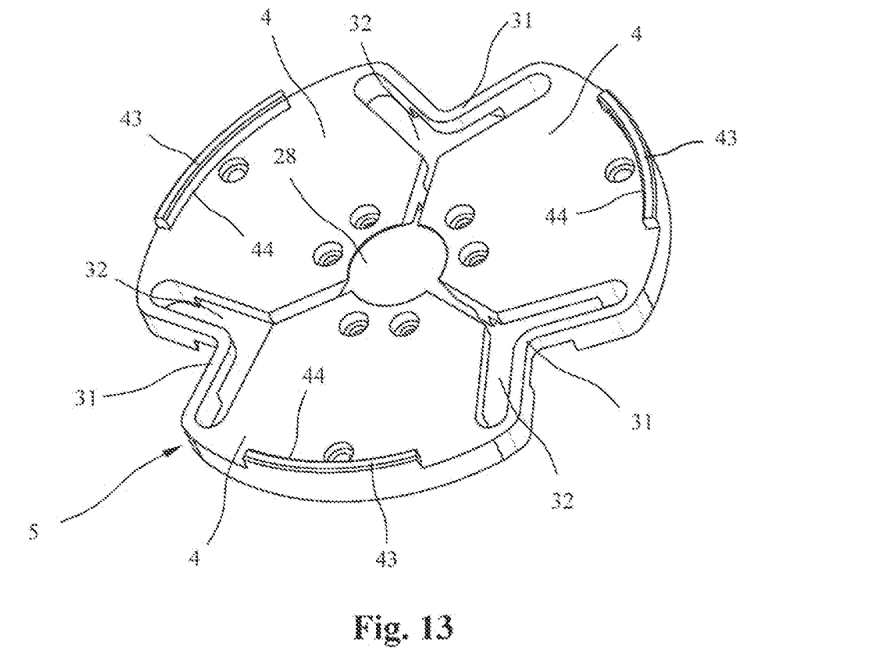
FIG. 13: another embodiment example of a disk-shaped clamping element in a perspective from above.
Figure 14:
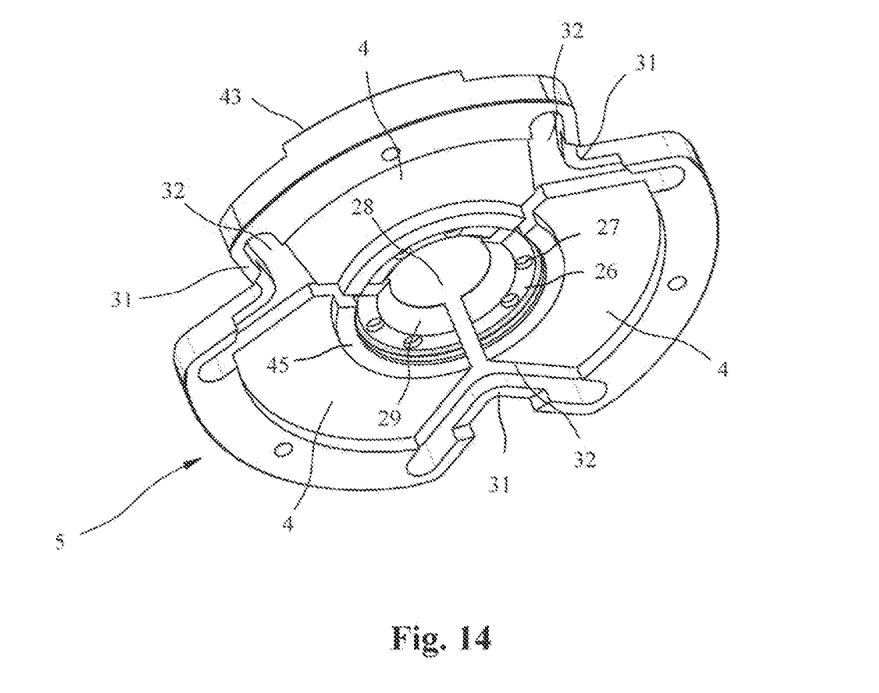
FIG. 14: the disk-shaped clamping element of FIG. 13 in a perspective from below.

In FIGS. 13 and 14, an embodiment example of a disk-shaped clamping element 5 is shown that is suitable for the outside clamping of components. In this embodiment, the radially movable clamping segments 4 have holding cross-links 43, protruding upward, for placement on the outside of the components to be clamped. In the example shown, the holding cross-links 43 are constructed as continuous annular segments for the clamping of a [sic] rotation-symmetrical, round components on the outside. The holding cross-links 43, however, can also be formed by arcs, at a distance from one another, or can also have a different correspondingly adapted shape for the clamping of other components. So as to make possible an even better force or pressure transfer from the clamping head 6 to the disk-shaped clamping element 5, one more or several additional surfaces or stops 45 can be provided on the underside of the clamping segments 4. Otherwise, the disk-shaped clamping element 5 of FIGS. 13 and 14 is designed as in the embodiment of FIGS. 5 and 6 with the V-shaped connecting cross-links 31. Components and features corresponding to one another are also provided with corresponding reference symbols.

Figure 15:
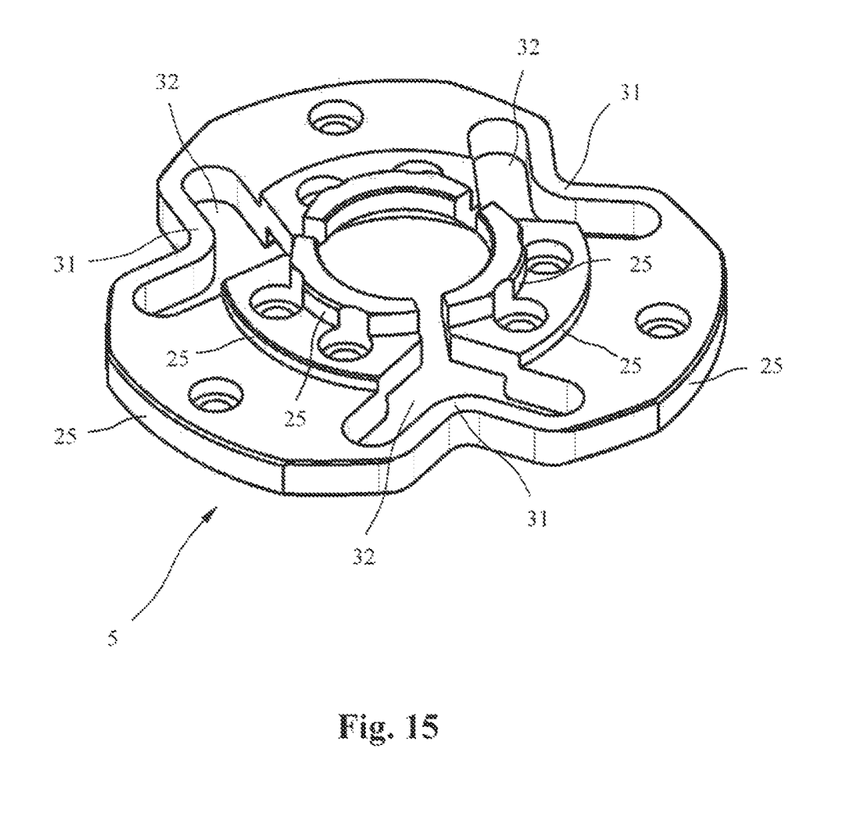
FIG. 15: another embodiment example of a disk-shaped clamping element in a perspective from above.

In another embodiment, the clamping element 5 can also have several clamping planes with different clamping surfaces and thus form a kind of multi-clamping element. FIG. 15 shows an embodiment example of such a clamping element 5. In this embodiment, there are several clamping surfaces 25 arranged in a stepped manner, which are graduated for the formation of different clamping diameters on the clamping segments 4. Just the same as for the embodiment with only one clamping plane, a combination for inside and outside clamping is also possible if corresponding holding cross-links 43 with individual inner pressure surfaces 44 are arranged on at least one of these clamping planes.

This embodiment of the invention with several clamping planes supported above one another makes possible the clamping of components with corresponding different diameters with only one clamping element in accordance with the invention. In this way, the purchase costs are reduced for the user, on the one hand, and in this way, on the other hand, the number of the changing operations necessary for different diameters of the clamping elements is reduced, which leads to an increased service life of the pertinent machine. Preferably, this multi-clamping element in accordance with the invention is formed from one piece, but, if necessary, can also be made from several individual elements, in particular, several individual clamping elements.

In addition, a disk-shaped support or workpiece support is not absolutely necessary, since the workpiece or component can be placed directly on the clamping element and/or multi-clamping element in accordance with the invention. The fundamental structure of this multi-clamping element with clamping segments and/or connecting cross-links, etc., corresponds to the embodiments described in the preceding.

The invention claimed is:

1. An apparatus for clamping a component on a rotating machine part, the apparatus comprising:
a basic body;
a clamping mandrel arranged in and axially displaceable in the basic body; and
a plurality of clamping segments mutually interconnected by flexible, connecting cross-links formed integrally with the clamping segments, the clamping segments arranged above the basic body and radially displaceable with respect to a center axis of the basic body;
wherein the plurality of clamping segments are moved by axial displacement of the clamping mandrel between a release position and a clamping position.

2. The apparatus according to claim 1, wherein the flexible, connecting cross-links are defined by slots or recesses formed between the clamping segments.

3. The apparatus according to claim 1, wherein the plurality of clamping segments are parts of a disk-shaped clamping element arranged above the basic body.

4. The apparatus according to claim 1, wherein the plurality of clamping segments are detachably affixed on a clamping head, the clamping head radially expandable by a sliding contact with the clamping mandrel when the clamping mandrel is moved axially, the clamping segments thereby expanded radially.

5. The apparatus according to claim 4, wherein the clamping head comprises a lower holding flange affixable to the basic body and an upper holding flange for affixing of the plurality of clamping segments or a disk-shaped clamping element comprising the plurality of clamping segments.

6. The apparatus according to claim 5, wherein the upper holding flange of the clamping head comprises a plurality of openings.

7. The apparatus according to claim 4, wherein the clamping head comprises a central passage opening having an at least partially tapering inside wall for holding a conical clamping part of the clamping mandrel.

8. The apparatus according to claim 7, wherein the clamping head comprises a plurality of slot-shaped recesses that extend from the central passage opening radially outward.

9. The apparatus according to claim 4, further comprising a pressure element arranged around the clamping head, the pressure element having one or more parts.

10. The apparatus according to claim 1, further comprising a support for placing the components to be clamped arranged below the plurality of clamping segments.

11. The apparatus according to claim 1, further comprising holding elements having inner clamping surfaces on an outside of the component to be clamped, the holding elements protruding upwardly on the plurality of clamping segments.

12. The apparatus according to claim 1, further comprising one or more stops or additional surfaces arranged on undersides of the plurality of clamping segments.

13. The apparatus according to claim 1, wherein the clamping mandrel is displaceable above a pneumatically-actuatable piston.

14. The apparatus according to claim 1, wherein the plurality of clamping segments further comprise a plurality of clamping surfaces for clamping components having different diameters.

15. The apparatus according to claim 14, wherein the plurality of clamping surfaces are arranged in differing planes.

16. The apparatus according to claim 1, wherein the rotating machine part is a part of a balancing machine.

17. An apparatus for clamping a component on a rotating machine part, the apparatus comprising:
a radially expandable clamping head;
a clamping mandrel axially displaceable within the clamping head along a central axis to cause radial expansion of the clamping head; and
a plurality of clamping segments connected to the clamping head, the clamping segments mutually interconnected by flexible, connecting cross-links formed integrally with the clamping segments, the clamping segments radially displaceable with respect to a center axis of the clamping head;
wherein the plurality of clamping segments are moved radially, by connection to the clamping head, by axial displacement of the clamping mandrel between a clamping position and a releasing position.

18. The apparatus of claim 17, the clamping mandrel including an outer tapered surface, the clamping head including an inner tapered surface, the outer tapered surface of the clamping mandrel slideable in a first axial direction along the inner tapered surface of the clamping head to cause radial expansion of the clamping head, the clamping mandrel slideable in a second axial direction opposite to the first axial direction to enable the clamping head to radially contract, the radial contraction caused at least in part by a resiliency of the connecting cross-links.

* * * * *